(12) United States Patent
Fischer et al.

(10) Patent No.: US 7,086,236 B2
(45) Date of Patent: Aug. 8, 2006

(54) METHOD FOR OPERATING A MOTOR VEHICLE FUEL TANK SYSTEM, ESPECIALLY A CRYOTANK SYSTEM AND CORRESPONDING TANK SYSTEM; FOR EXAMPLE, FOR LIQUID HYDROGEN

(75) Inventors: Gregor Fischer, Ismaning (DE); Juergen Turini, Stefansberg (DE); Bernhard Strauss, München (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/772,406

(22) Filed: Feb. 6, 2004

(65) Prior Publication Data
US 2004/0154314 A1    Aug. 12, 2004

Related U.S. Application Data

(63) Continuation of application No. PCT/EP02/07649, filed on Jul. 9, 2002.

(30) Foreign Application Priority Data
Aug. 9, 2001    (DE) ............................... 101 39 136

(51) Int. Cl.
*F17C 7/04* (2006.01)
(52) U.S. Cl. .................. 62/48.1; 62/48.4; 62/53.2; 62/61; 62/78; 220/88.3; 220/560.1; 222/152
(58) Field of Classification Search ................ 62/48.1, 62/48.4, 53.2, 61, 78; 220/88.3, 560.1, 560; 222/152
See application file for complete search history.

(56) References Cited

U.S. PATENT DOCUMENTS

| | | | | |
|---|---|---|---|---|
| 2,375,834 A | * | 5/1945 | Walker | ...................... 220/88.3 |
| 2,889,955 A | * | 6/1959 | Naulty et al. | .............. 220/88.3 |
| 3,693,915 A | * | 9/1972 | Ulanovsky | .............. 244/135 R |
| 4,570,446 A | | 2/1986 | Matsubara et al. | ............ 62/48 |
| 4,570,578 A | * | 2/1986 | Peschka et al. | ............. 123/1 A |
| 5,156,925 A | | 10/1992 | Lapp | ........................... 429/19 |
| 5,540,208 A | * | 7/1996 | Kikutani | ..................... 123/518 |

(Continued)

FOREIGN PATENT DOCUMENTS

DE    36 00 177 A1    7/1986

(Continued)

OTHER PUBLICATIONS

International Search Report.

(Continued)

*Primary Examiner*—Cheryl Tyler
*Assistant Examiner*—B. Clayton McCraw
(74) *Attorney, Agent, or Firm*—Crowell & Moring LLP

(57) ABSTRACT

A method and system for venting accumulations of leakage from a vehicle cryo fuel tank system, whereby elements of the tank system like lines, valves and/or a storage container for the fuel are enveloped at least partially by a capsule, the interior of the capsule is vented regularly as a function of at least one boundary condition by a pressure differential, and the exhausted gas from the capsule is treated to reduce its environmental impact. The venting may be performed using an inert gas as the rinsing medium. The gas can be burned or oxidized catalytically, and may be disposed of by a separate burner or by an internal combustion engine of the vehicle. A blower, arranged outside the capsule may generate the pressure differential. Alternatively, the pressure differential may be generated within the capsule by convective forces or a stagnation pressure generated by movement of the vehicle.

16 Claims, 1 Drawing Sheet

U.S. PATENT DOCUMENTS

| | | |
|---|---|---|
| 6,260,587 B1 | 7/2001 | Smith, Jr. .................. 141/59 |
| 2001/0045364 A1 | 11/2001 | Hockaday et al. .......... 205/338 |
| 2002/0047015 A1 | 4/2002 | Distelhoff et al. .......... 220/562 |

FOREIGN PATENT DOCUMENTS

| | | | |
|---|---|---|---|
| DE | 41 42 016 | A1 | 6/1993 |
| DE | 198 13 321 | A1 | 10/1999 |
| DE | 198 53 097 | A1 | 5/2000 |
| DE | 41 34 199 | C2 | 6/2000 |
| DE | 199 29 421 | A1 | 12/2000 |
| DE | 199 51 033 | A1 | 4/2001 |
| DE | 100 63 490 | A1 | 12/2001 |
| EP | 0 745 499 | A2 | 12/1996 |
| EP | 0 781 958 | A2 | 7/1997 |
| FR | 2 226 615 | | 11/1974 |
| JP | 62-255513 | | 11/1987 |
| JP | 06-081732 | | 3/1994 |

OTHER PUBLICATIONS

German Search Report.

* cited by examiner

Figure
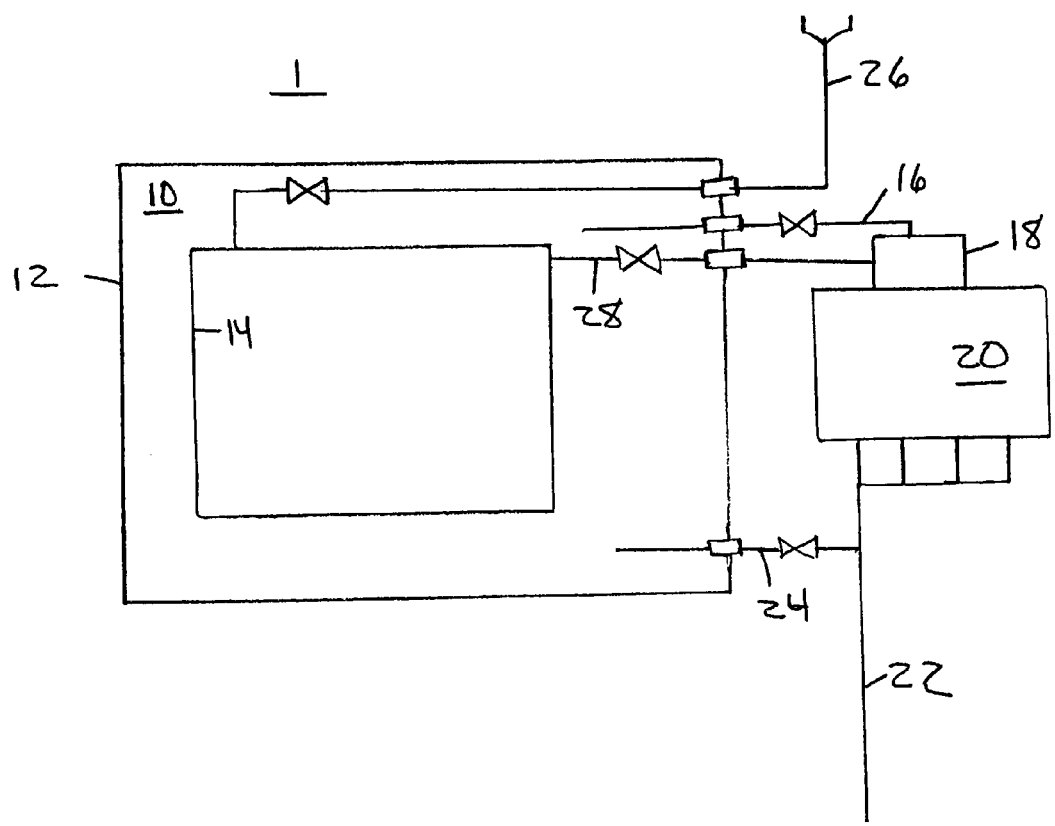

METHOD FOR OPERATING A MOTOR VEHICLE FUEL TANK SYSTEM, ESPECIALLY A CRYOTANK SYSTEM AND CORRESPONDING TANK SYSTEM; FOR EXAMPLE, FOR LIQUID HYDROGEN

The present application is a continuation of International Patent Application No. PCT/EP02/07649, filed Jul. 9, 2002, designating the United States of America, the entire disclosure of which is incorporated herein by reference. Priority is claimed based on Federal Republic of Germany patent document DE 101 39 136.9 filed Aug. 9, 2001.

BACKGROUND AND SUMMARY OF THE INVENTION

The invention relates to a process for operating a vehicle fuel tank system, in particular a cryo tank system, for example, for liquid hydrogen, whereby elements of the tank system, like lines, valves or the like and/or a storage container for the fuel, are enveloped at least partially by a capsule, the interior of which is vented at least from time to time. Furthermore, the invention relates to a corresponding vehicle fuel tank system. For the technical environment reference is made to the DE 195 46 618 C2 and also to the EP 0 069 717 B1 solely for the sake of providing an example.

Searching for alternative drive energies for motor vehicles, one is also working with liquefied gases in general and with hydrogen in particular. In this respect a liquefied gas or hydrogen in the liquid form is stored in a so-called cryo tank. Different lines, in which there are, for example, valves, but also heat exchangers or generally fluid conveying elements of the tank system, lead into the tank or out of the tank, thus, among other things, to the fuel operated internal combustion engine. Another line, leading out of a cryo tank, can serve to carry away the so-called boil off gas.

In cryo tank systems it is customary to encapsulate at least sections or parts of these aforementioned or also other system elements, that is to arrange inside a so-called capsule that is built around these elements or parts of the same. Optionally this capsule can also enshroud the vehicle tank itself. This capsule, which, with the exception of an optionally blockable venting line, is sealed against its immediate environment for various reasons, can extend simply from the actual tank up to the internal combustion engine or the like, to be supplied with the fuel, stored in the tank.

Moreover, the use of such a capsule in a vehicle tank system is not limited to a cryo tank system. Rather an encapsulation can also be realized in past conventional motor vehicle tank systems, in which gasoline or diesel fuel is stored, in order to meet the increasingly tighter legal regulations regarding the evaporation losses from the fuel system. In addition, a capsule of an LNG tank system can also be appropriate.

Basically gas concentrations that are critical under unfavorable conditions can form in the said capsule. Due to leakage, which is not always totally avoidable, gaseous fuel can flow from the fuel tank system into the interior of the capsule and collect there. Furthermore, when in the case of a cryo tank its gases are exhausted in a line through the capsule, there is the risk that the air will be liquefied in this extremely cold exhaust line, the result of which is an oxygen enrichment in the capsule. Thus, the formation of ignitable mixtures in the capsule cannot be ruled out with absolute certainty, and in particular not even if this capsule is vented. Such venting occurs at least in the in-house state of the art using a venting line, emptying outside the vehicle, whereby the capsule serves primarily to collect leakage gases of the tank system and to prevent these gases from penetrating into the interior of the vehicle.

Furthermore, the simple exhausting of gases, collecting in the capsule, into the environment is not always nonproblematical, if it occurs at all on a sufficient scale. In addition to possible environmental problems, one can name in this connection fundamental problems relating to the approval process for the vehicle due to legal regulations.

Therefore, the object of the present invention is to provide a measure to remedy the described problems.

With respect to the operating process for a vehicle fuel tank system, the solution to this problem is characterized in that to vent the interior of the capsule, a pressure difference is produced and that the gas, which is exhausted thus and which flows over unavoidable leakages from the tank system into the interior, is further processed and thus specifically disposed so that there is no danger to the environment.

With respect to the related claim, relating to a vehicle fuel tank system, the solution to the said problem is characterized in that, in addition to a device for generating a pressure differential between the interior of the capsule and the environment in a connecting line to the environment, there is a disposal device for the exhausted gas, which flows over unavoidable leakages out of the tank system into the interior of the capsule, in which this gas is further treated in such a manner that there is no danger to the environment.

Additional embodiments are discussed further below.

BRIEF DESCRIPTION OF THE DRAWINGS

The FIGURE is a schematic illustration of a vehicle cryo fuel tank system in accordance with an embodiment of the present invention.

DETAILED DESCRIPTION

The invention ensures that the gases or gas mixtures, which accumulate in the interior 10 of the capsule 12 surrounding cryo fuel tank 14 and which are to some degree dangerous, are removed again and again from the capsule and, in so doing, are further treated in such a manner that there are no problems with respect to the ecology or the environment. As shown in the FIGURE, for example, the gas, exhausted from the intermediate space 10, can pass through vent line 16 to the intake 18 of the vehicle's internal combustion engine 20 to be burned as part of its disposal so that only the resulting exhaust gases, which are then harmless, get through exhaust line 22 into the environment. As an alternative, the exhausted gas for disposal can also be oxidized catalytically and thus rendered harmless, after there is no longer any possibility of this gas igniting in the atmospheric oxygen.

With respect to the venting itself, this can be carried out with a so-called rinsing medium, which quasi produces the said pressure differential. The use of a rinsing medium guarantees that even if only a relatively small pressure differential can be provided, the dangerous gas or gas mixture that was previously in the interior of the capsule can be conveyed, that is, can be removed, with certainty from the interior. If in this respect an inert gas is used as the rinsing medium, it is guaranteed that no undesired chemical reaction is kindled. That is, it is certain that the gas mixture, to be exhausted by the pressure differential, cannot be ignited. In a motor vehicle, which is provided with a tank system 1 for supplying the internal combustion engine driving the vehicle (with tank fill line 26 and engine supply line 28), there is already advantageously a source for such an inert gas, and in particular in the form of exhaust gas, emitted by the internal combustion engine and conveyed via exhaust branch line 24 into interior space 10.

Preferably the said interior of the capsule is vented in essence regularly as a function of at least one boundary condition, in order to rule out that—for example, even during prolonged parking phases of the motor vehicle—no dangerous quantity of gases collects in the interior of the capsule. The venting of the interior can be done in a simple manner so as to be controlled over time. That is, for example, at regular time intervals the described rinsing of the interior with a rinsing medium can be carried out for a certain period of time.

As an alternative, the venting, controlled by a pressure differential, can be done if there is/are one or more different specific gas concentration(s) in the interior of the capsule, whereby this concentration (these concentrations) must be determined or monitored continuously by suitable means. Strictly speaking, the ratio of the oxygen concentration to the fuel gas concentration (or in a preferred case of application to the hydrogen concentration) is of importance. In this respect the said venting can be carried out in general even upon reaching a specific oxygen concentration in the interior of the capsule.

It was already stated that the gas or gas mixture, exhausted from the interior of the capsule, can be burned as part of its disposal, so that only the resulting exhaust gases, which are then harmless, get into the environment. To this end a special burner and in a preferred embodiment a so-called boil off burner can be provided in a connecting line between the interior of the capsule and the environment. The boil off gas of a cryo tank is burned, as well-known, on or in a boil off burner. The resulting exhaust gases in the burner can then be simply released into the environment without any danger.

Moreover, the said combustion can also be done catalytically with the choice of a suitable burner material. Furthermore, the burner can also be ignited catalytically. This catalytic basis renders disposal advantageous without any external additional energy cost.

A special case of a burner is formed by the internal combustion engine driving the vehicle, where the fuel, for example the hydrogen gas, is burned in any case. At this stage only the gas mixture, which is removed from the interior of the capsule, has to be fed together with the combustion gas to this already existing internal combustion engine, so that—at least as long as the internal combustion engine is operated—no additional so-called disposal device is needed. For the rest period of the internal combustion engine, a catalytic oxidizer can be provided, for example, as a disposal device for the gas rinsed out of the interior of the capsule, whereby it is pointed out explicitly that such an oxidizer can be on hand as the sole so-called disposal device.

It was stated above that the interior of the capsule can be rinsed by generating a pressure differential or should be rinsed in essence regularly. To rinse with overpressure, a pump system, arranged in essence outside the capsule, can be used, such as a blower or a pump that is driven preferably by an electric motor. Optionally one can also resort to an already existing pump system, for example when the internal combustion engine, driving the motor vehicle, is provided with a turbo charger for increasing the power. However, even if the rinsing procedure is started with a vacuum, the device for generating a pressure differential can be a component of the internal combustion engine, driving the vehicle, because it is well known that an internal combustion engine generates in its intake cycle a vacuum that can be used for rinsing.

However, a vacuum for generating the said pressure differential for a rinse process can also be generated by a suction pump or the like. As an alternative or in addition, in a corresponding embodiment a separate boil off burner, the operation of which also produces a vacuum, can also be used to rinse the interior of the capsule. That is, the boil off burner can act not only as the disposal device for the gas mixture, accumulating in the capsule, but also as a device for generating a pressure differential for removing any accumulated so-called capsule gases from the said interior.

In principle both the so-called disposal device, in which the capsule gases are rendered harmless and the so-called device for generating a pressure differential between the interior of the capsule and the environment or parts or elements of the same can be a component of the capsule. Moreover, to generate a pressure differential or to rinse the intermediate space, convective forces can also be used so that optionally there is no need for an expensive device. Finally as another variant the stagnation pressure, which builds up as the vehicle continues to move, can be used as the pressure source for rinsing the interior of the capsule.

Owing to the described embodiment of a capsule, which (refering below only to the preferred application case) contains parts or all of the components of a hydrogen cryo storage, with which the hydrogen makes contact, and owing to the rinsing of such a capsule, any leakages at these components can be sensed collectively and safety risks can be prevented by forming ignitable gas mixtures in this capsule. Due to the use of a corresponding disposal device of the described type any capsule gases can be disposed without damaging the environment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for venting an interior space of a capsule of a vehicle cryo fuel tank system, the capsule containing at least one of a line, a valve and a storage container for a cryo fuel, comprising the acts of:
   generating a pressure differential between the capsule interior space and a space exterior to the capsule, where the capsule interior space is a space between a inside wall of the capsule and an outside wall of the storage container therein;
   applying the pressure differential to a gas in the capsule interior space with a rinsing medium to cause a gas in the capsule interior space to be exhausted from the capsule, wherein the rinsing medium is a vehicle internal combustion engine exhaust gas, wherein the exhaust of gas from the capsule interior space is controlled to extend over a predetermined time; and
   treating the gas from the capsule interior space to reduce its environmental impact.

2. The method of claim 1, wherein the venting is performed when at least one boundary condition is satisfied.

3. The method of claim 2, wherein the at least one boundary condition includes a predetermined gas concentration within the capsule interior space.

4. The method of claim 1, wherein the act of treating the gas includes burning the gas.

5. The method of claim 1, wherein the act of treating includes catalytic oxidation of the gas.

6. A vehicle cryo fuel tank system, comprising:
a cryo tank capsule, wherein the capsule envelopes at least one of a line, a valve and a storage container for a cryo fuel in a capsule interior space, where the capsule interior space is a space between a inside wall of the capsule and an outside wall of the storage container therein;
a pressure differential generator; and
a gas treatment device,
wherein the pressure differential generator generates a pressure differential between the capsule interior space and a space exterior to the capsule with an exhaust gas of an internal combustion engine of the vehicle, a gas in the capsule interior space is driven by the pressure differential from the capsule interior space, and the gas is treated by the gas treatment device to reduce its environmental impact, and
wherein the exhaust of gas from the capsule interior space is controlled to extend over a predetermined time.

7. The vehicle cryo fuel tank system of claim 6, wherein the gas treatment device is a burner.

8. The vehicle cryo fuel tank system of claim 7, wherein the gas treatment in the burner is at least one of initiated and sustained by catalytic reaction.

9. The vehicle cryo fuel tank system of claim 7, wherein the burner is an internal combustion engine.

10. The vehicle cryo fuel tank system of claim 6, wherein the gas treatment device is a catalytic oxidizer.

11. The vehicle cryo fuel tank system of claim 6, wherein the pressure differential generator is one of a blower and pump arranged outside the capsule.

12. The vehicle cryo fuel tank system of claim 6, wherein the pressure differential generator is a component of an internal combustion engine.

13. The vehicle cryo fuel tank system of claim 7, wherein the burner is the pressure differential generator.

14. The vehicle cryo fuel tank system of claim 6, wherein the capsule is the pressure differential generator, and convective forces within the capsule generate the pressure differential to exhaust the gas from the capsule interior space.

15. The vehicle cryo fuel tank system of claim 6, wherein the capsule is the pressure differential generator, and stagnation pressure generated within the capsule as the vehicle moves generates the pressure differential to exhaust the gas from the capsule interior space.

16. A vehicle cryo fuel tank system, comprising:
a cryo tank capsule, wherein the capsule envelopes at least one of a line, a valve and a storage container for a cryo fuel in a capsule interior space, where the capsule interior space is a space between a inside wall of the capsule and an outside wall of the storage container therein;
means for generating a pressure differential; and
means for treating a gas in the capsule interior space,
wherein the gas in the capsule interior space is driven by the pressure differential from the capsule interior space with an exhaust gas of an internal combustion engine of the vehicle, and the gas is treated by the gas treatment means to reduce its environmental impact. and wherein the exhaust of gas from the capsule interior space is controlled to extend over a predetermined time.

* * * * *